March 7, 1967 W. D. WHITAKER 3,307,426
CONSTANT SPEED DRIVE STARTER
Filed Jan. 11, 1960 9 Sheets-Sheet 1

INVENTOR
WILLIAM D. WHITAKER
BY
ATTORNEY

March 7, 1967 W. D. WHITAKER 3,307,426
CONSTANT SPEED DRIVE STARTER
Filed Jan. 11, 1960 9 Sheets-Sheet 2
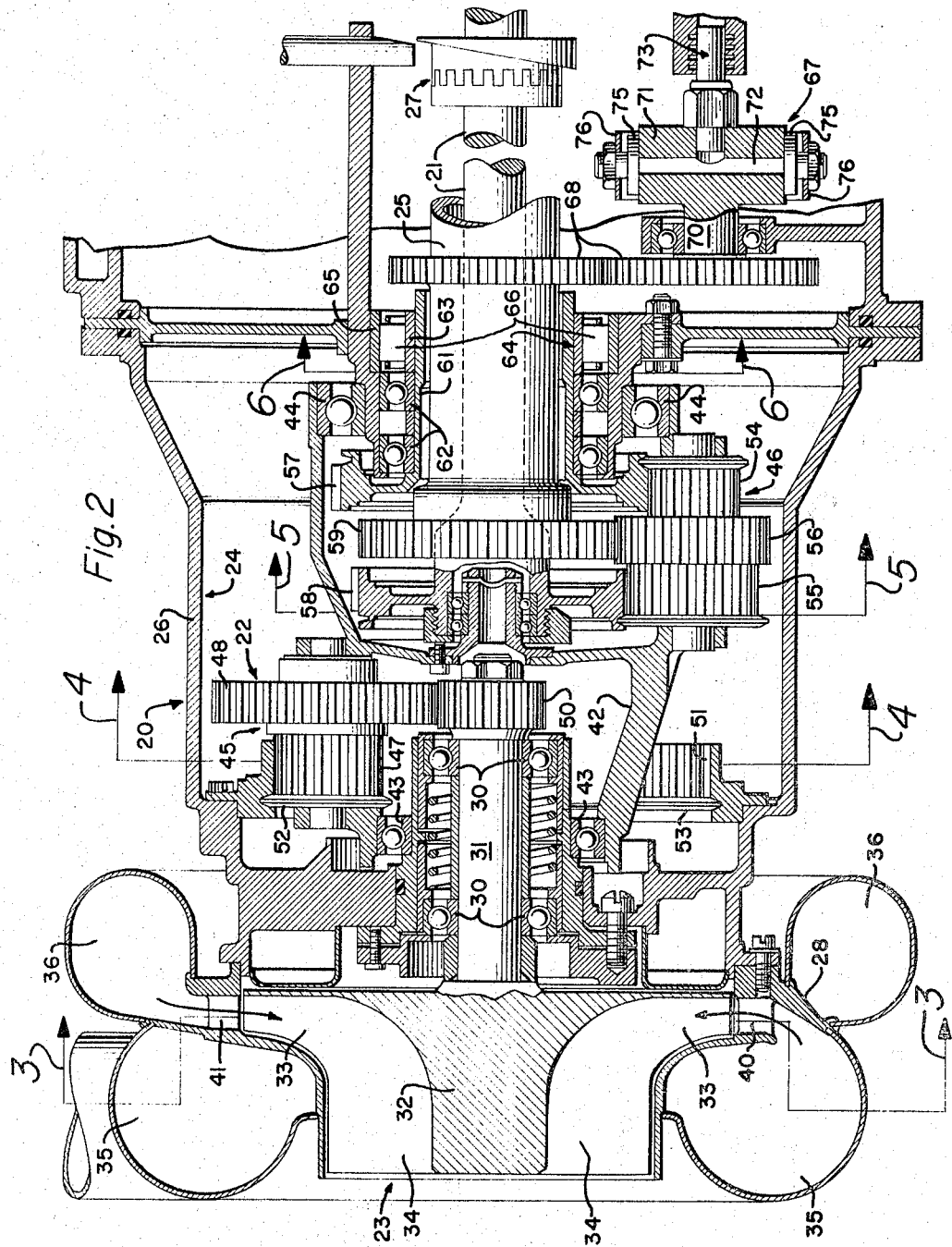
INVENTOR
WILLIAM D. WHITAKER
BY
Herschel C. Omohundro
ATTORNEY March 7, 1967 W. D. WHITAKER 3,307,426
CONSTANT SPEED DRIVE STARTER
Filed Jan. 11, 1960 9 Sheets-Sheet 3
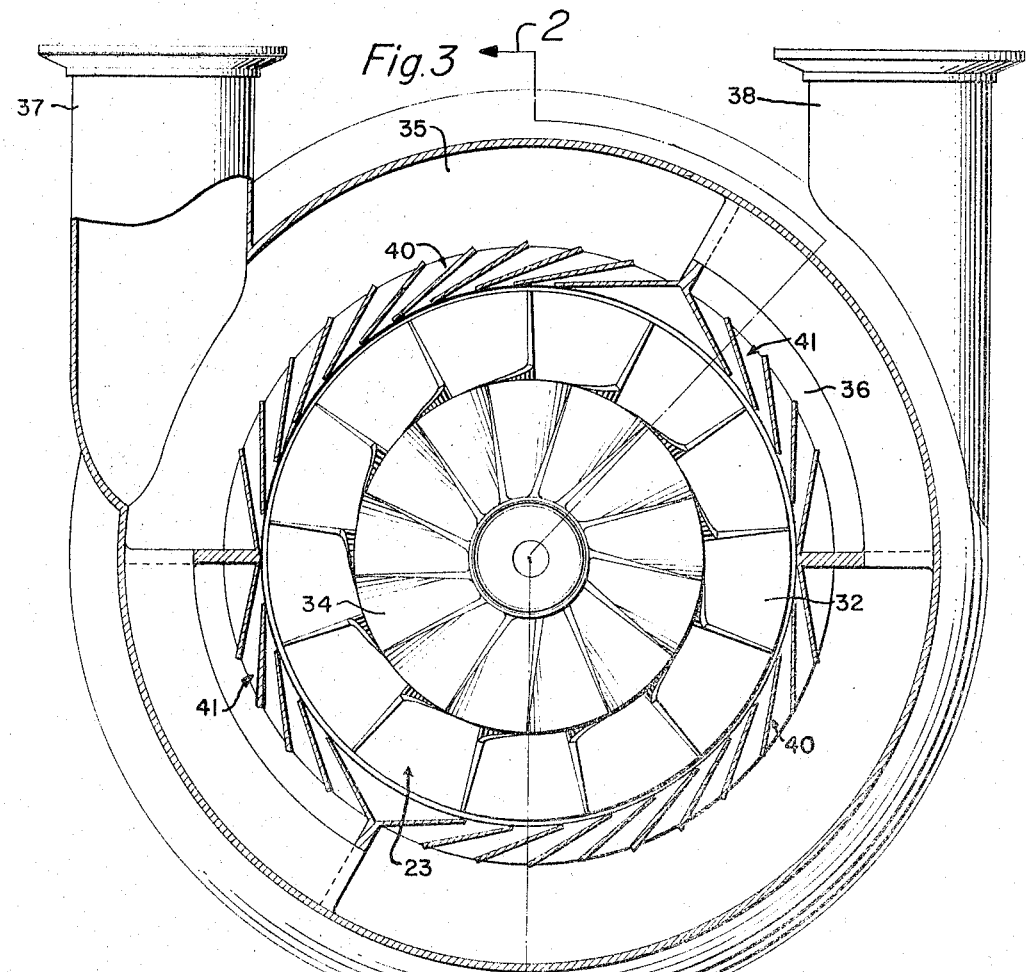
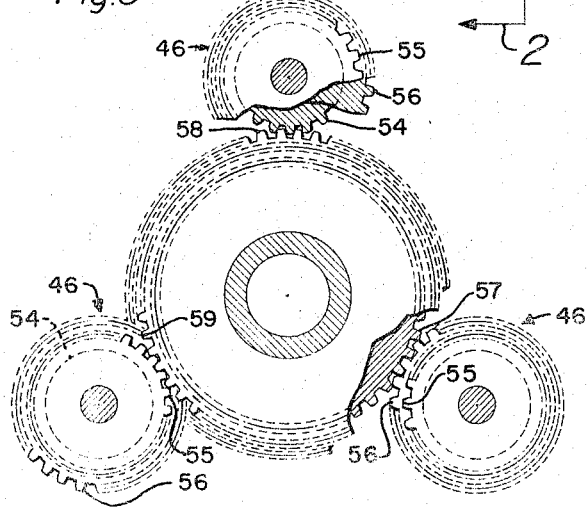
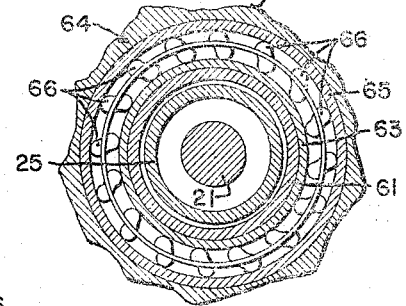
INVENTOR
WILLIAM D. WHITAKER
BY
Herschel E. Umshinder
ATTORNEY

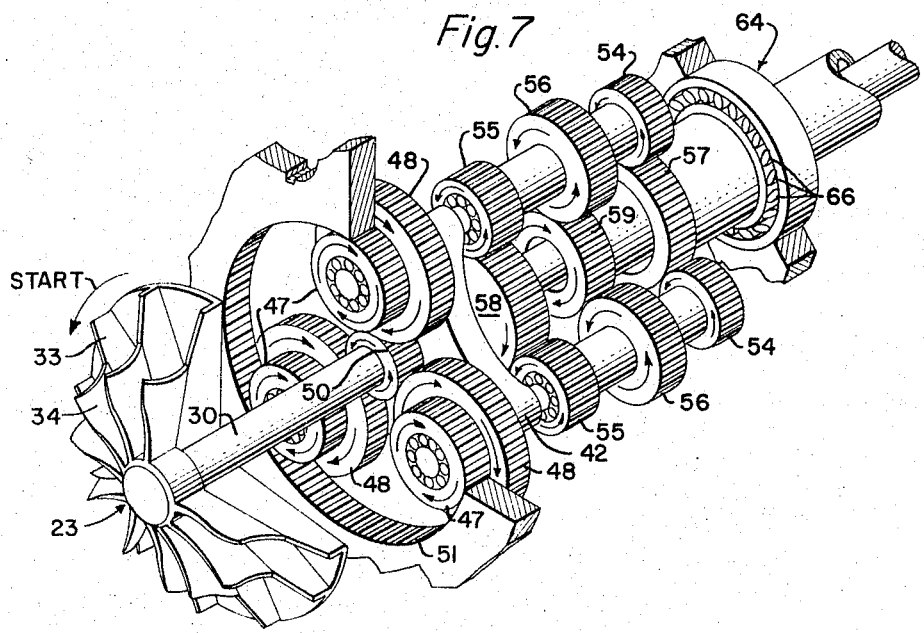
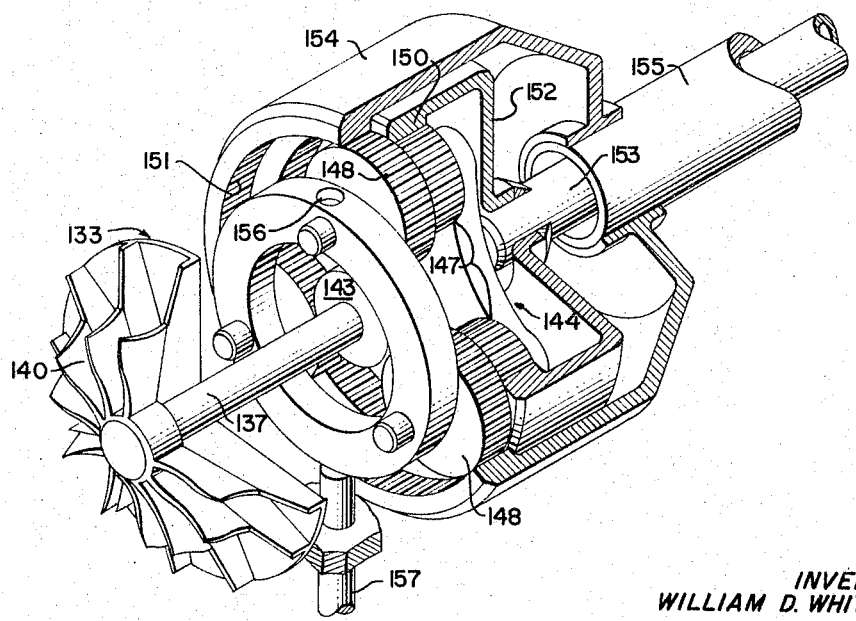

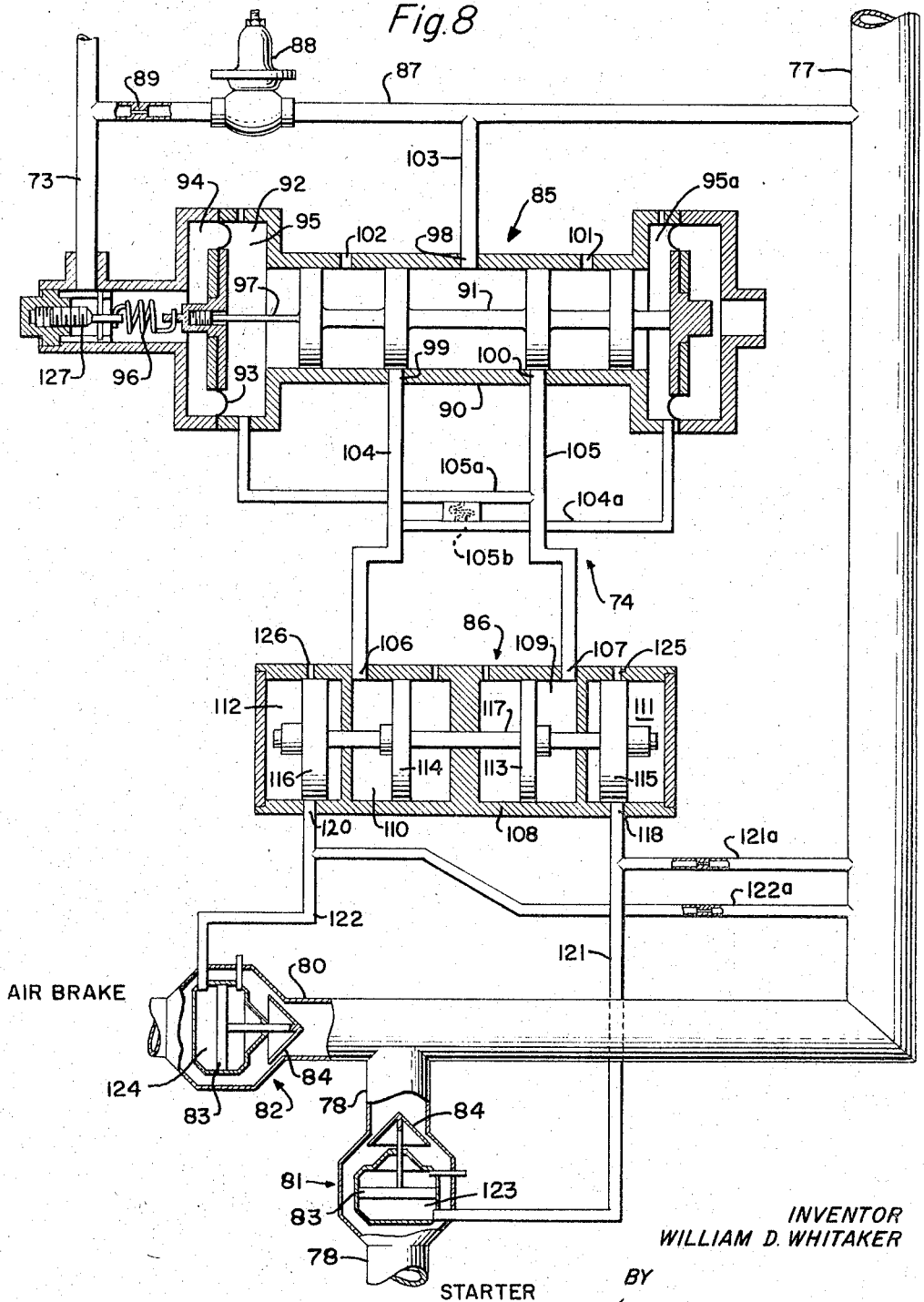

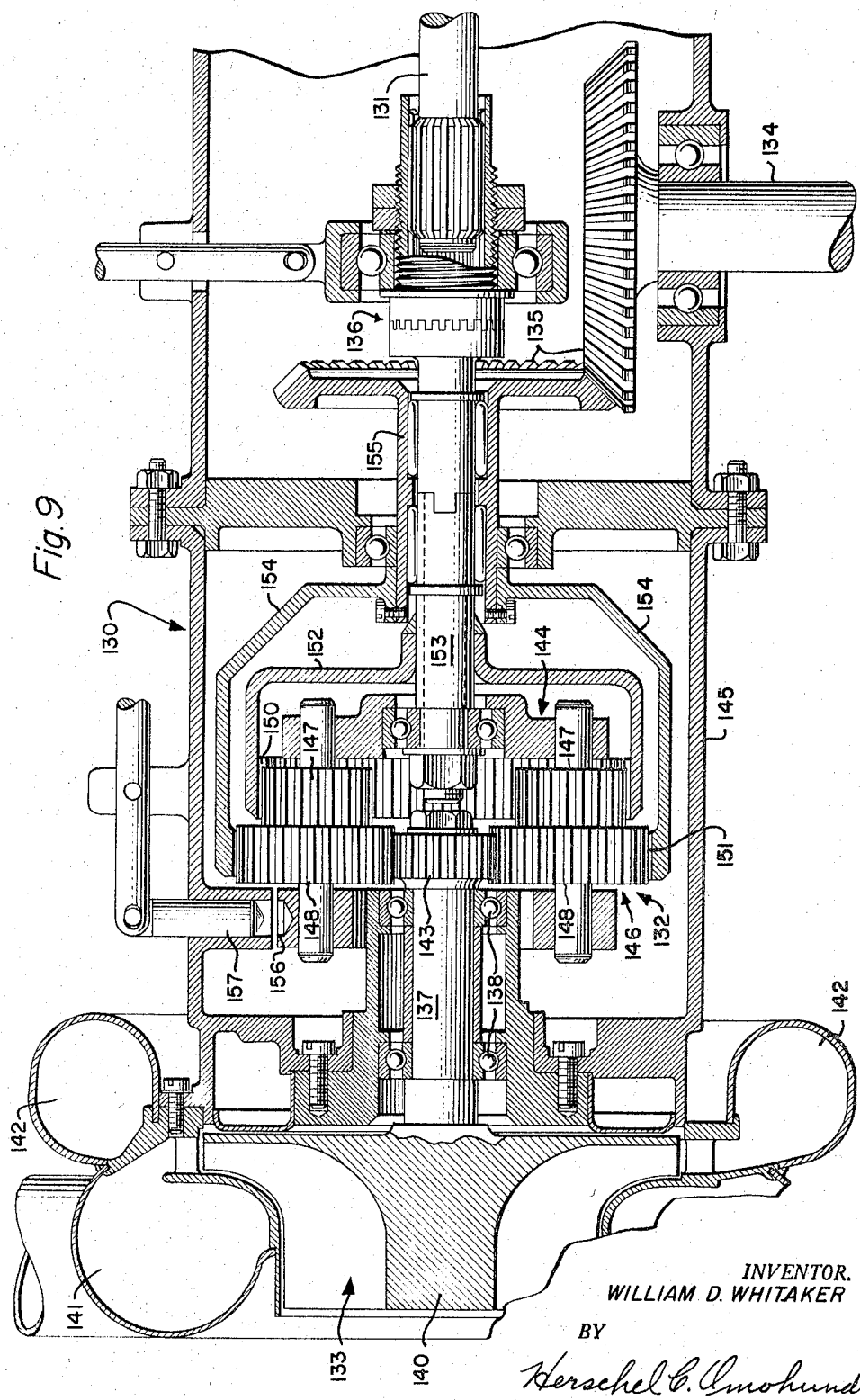

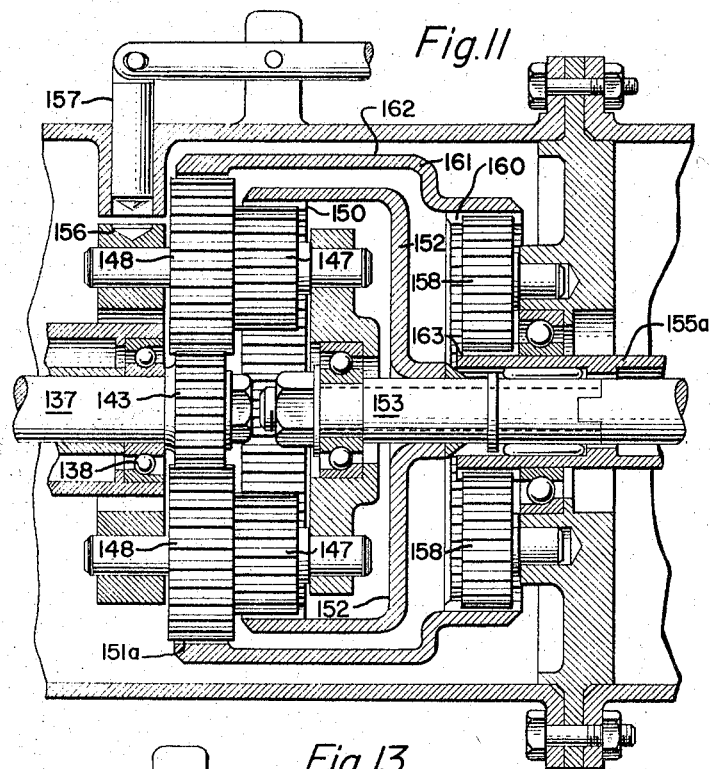
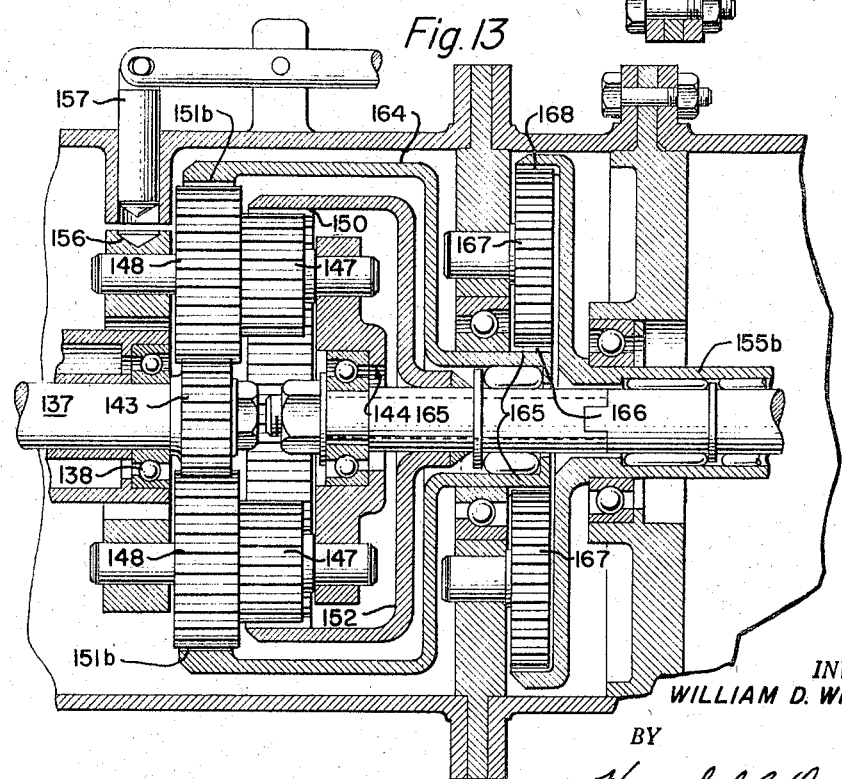

March 7, 1967 W. D. WHITAKER 3,307,426
CONSTANT SPEED DRIVE STARTER
Filed Jan. 11, 1960 9 Sheets-Sheet 8

INVENTOR
WILLIAM D. WHITAKER
BY
Herschel C. Omohundro
ATTORNEY

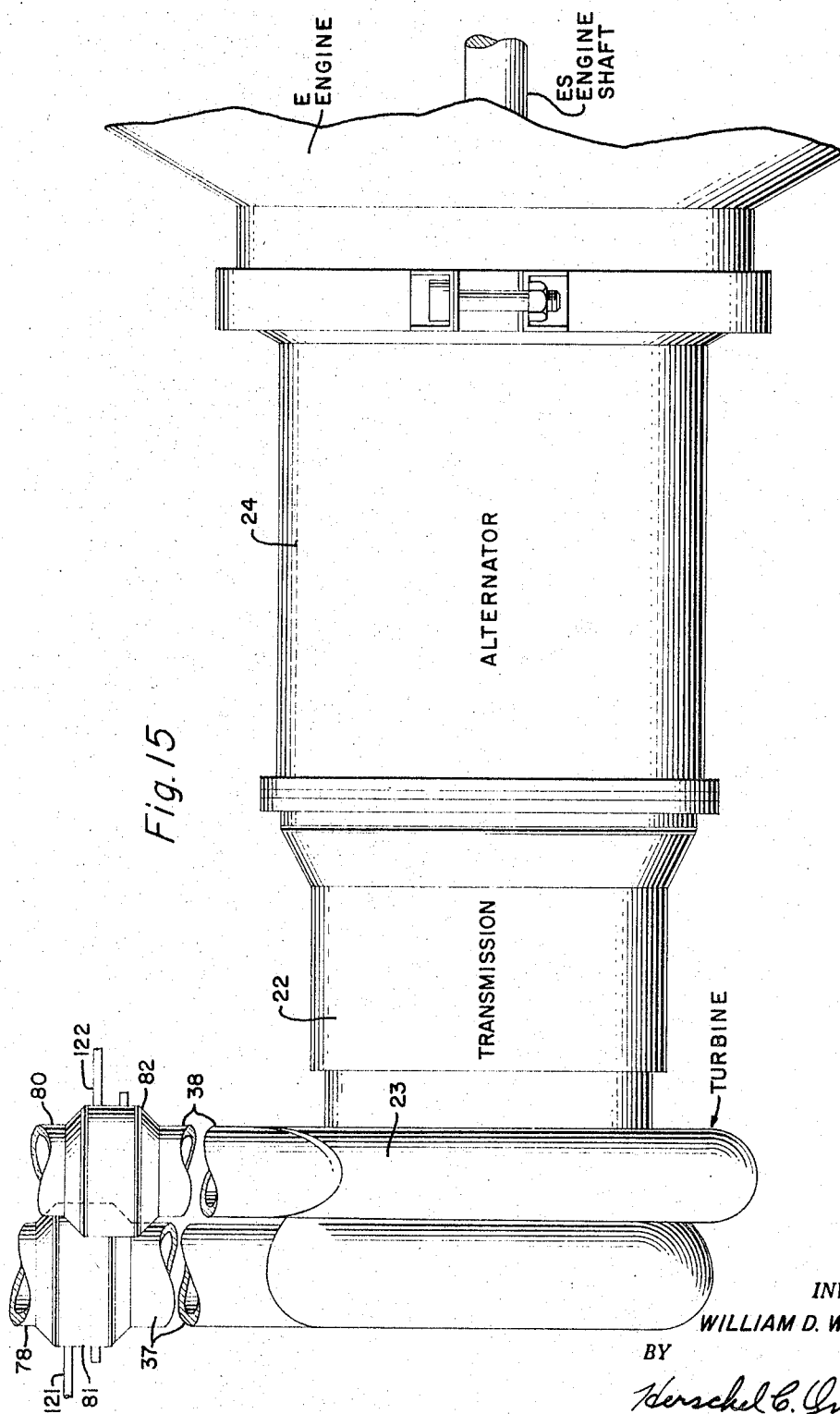

United States Patent Office 3,307,426
Patented Mar. 7, 1967

3,307,426
CONSTANT SPEED DRIVE STARTER
William D. Whitaker, Phoenix, Ariz., assignor to The Garrett Corporation, Los Angeles, Calif., a corporation of California
Filed Jan. 11, 1960, Ser. No. 1,489
33 Claims. (Cl. 74—675)

This invention relates generally to engine accessories and is more particularly directed to starters and transmissions for use between starting motors and engines and between the latter and other engine accessories, such as generators, alternators, and the like, which must be operated at constant speeds.

The present invention is still more specifically directed to combination engine starter and accessory drive mechanisms of the type shown and described in Patent No. 2,908,189, dated October 13, 1959, in which the engine equipped with the device contributes the major portion of the power to drive the accessory, and an auxiliary motor functions to trim the speed of the accessory to keep it constant even when the engine speed varies.

An object of the invention is to provide a combination engine starter and accessory drive mechanism which has a wider range of operation than prior devices of this character and in which more power is mechanically transmitted directly to the accessory at a certain stage of engine operation than in former mechanisms, thus increasing the efficiency of the new device.

Another object of the invention is to provide a combination engine starter and accessory drive mechanism having a reversible, variable speed auxiliary motor and a novel transmission arrangement by which the motor operates in one direction to impart starting torque to the engine, then has the speed of the motor automatically varied in accordance with the rate of operation of a part of the transmission to maintain a constant speed of an accessory of the engine, the transmission being so designed that when the engine is operating in a selected speed range the auxiliary motor will be stopped or operating at a very low power requirement and will operate in a reverse direction to trim the speed of the accessory when the speed of the engine exceeds the selected range.

Another object of the invention is to provide a combination engine starter and accessory drive mechanism having a reversible, variable speed auxiliary motor and a transmission arrangement for establishing a motion transmitting connection between the motor, the engine, and the accessory, the transmission having means which automatically holds certain parts against movement when the motor is initially operated in one direction so that starting torque will be imparted to the engine, the engine then transmitting motion through the transmission to drive the accessory, the mechanism being provided with control means operated in response to the speed of operation of one or more parts to vary the speed of the motor to trim the speed of the accessory, the speed of the motor being decreased as the engine speed increases until the motor stops, the engine speed then being at a predetermined rate; the mechanism is provided with means operative when the engine exceeds the predetermined rate to cause the motor to operate in the reverse direction to further trim the speed of the accessory.

A further object of the invention is to provide a combination engine starter and accessory drive mechanism having an air turbine motor and a novel transmission for establishing motion transmitting connections between the turbine, the engine, and the accessory, the turbine having nozzle means for causing forward and reverse operation thereof, the mechanism having additional means for controlling the speed of the turbine in both directions to trim the speed of the accessory and at predetermined times to interrupt or limit the flow of operating fluid to the turbine, so that it will apply to the transmission a load required to restrict the accessory to a constant speed, the turbine serving at certain times in the nature of a compressor or air pump to expend work on the operating fluid.

A still further object of the invention is to provide a combination engine starter and accessory drive mechanism of the type mentioned in the preceding paragraph, the transmission having planetary gears and other gear means meshing therewith together with means for restraining certain of the gear means against movement in one or more directions at predetermined times, so that the planetary gears will react in a certain manner during the engine starting operation and in another manner after the operation of the engine has commenced, the ratio of the gears selected being such that predetermined percentages of torque will be transmitted to the accessory by the engine and the turbine at certain engine speeds and different percentages at other engine speeds.

Another object is to provide a mechanism of the type mentioned above with means for locking certain parts against operation and interrupting the driving connection between the engine and the transmission so that the accessory only can be driven by the turbine when desired or required by particular circumstances.

Other objects and advantages will be pointed out or made apparent by the following description of some adaptations of the invention illustrated in detail in the accompanying drawings in which:

FIG. 2 is a vertical longitudinal sectional view of one form of a combined engine starter and accessory drive mechanism embodying the principles of the present invention;

FIG. 3 is a vertical transverse sectional view of the mechanism taken on the plane indicated by the line 3—3 of FIG. 2;

FIG. 5 is a vertical transverse sectional view taken on the plane indicated by the line 5—5 of FIG. 2;

FIG. 6 is a fragmentary vertical sectional view on a larger scale of a brake employed in the mechanism shown in FIG. 2, the plane of the section being indicated by the line 6—6 of FIG. 2;

FIG. 7 is a schematic view in perspective showing the arrangement of gears employed in the mechanism shown in FIG. 2;

FIG. 8 is a schematic view of the system for admitting and controlling the flow of operating fluid to the air turbine motor of the mechanism shown in FIG. 2;

FIG. 9 is a vertical longitudinal sectional view of a modified form of combined engine starter and accessory drive mechanism embodying the invention;

FIG. 10 is a schematic view in perspective showing the gears of the transmission used in the form of the invention shown in FIG. 9;

FIG. 11 is a fragmentary vertical longitudinal sectional view of a further modified form of the invention;

FIG. 13 is also a fragmentary vertical longitudinal sectional view of a still further modified form of the invention;

FIG. 15 is a side elevational schematic view of a combined engine starter and accessory drive mechanism formed in accordance with the invention and installed on an engine, a portion only of the latter being shown.

Figure 1:
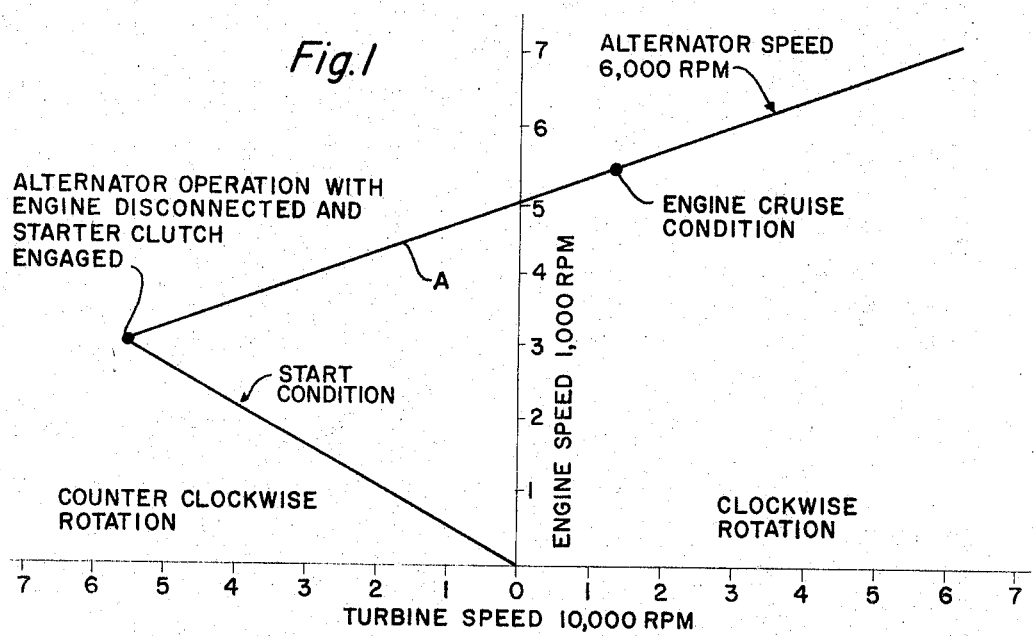
FIG. 1 is a graphic illustration showing a comparison of the speeds and direction of rotation of the turbine, which forms the auxiliary motor of one form of a combined engine starter and accessory drive mechanism embodying the subject matter of the invention, relative to the speeds of the engine to which the mechanism is applied.
Figure 4:
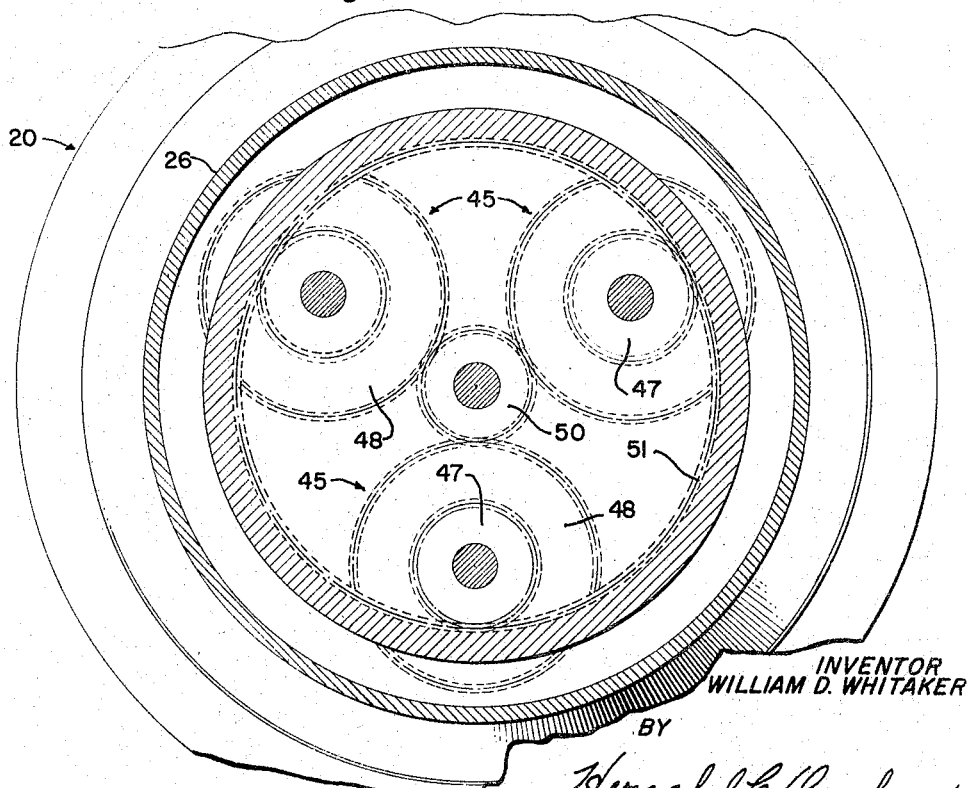
FIG. 4 is a similar view taken on the plane indicated by the line 4—4 of FIG. 2.

Referring more particularly to the drawings, FIGS. 1–8, inclusive, relate to a first embodiment of the invention. FIG. 1 shows a graph on which the speed and direction of rotation of the turbine are plotted relative to the speeds of the alternator and the engine.

As pointed out in the objects, it is desired to start the engine by driving the turbine in one direction to impart rotary movement to the engine, then after the engine operation is initiated the speed of rotation of the turbine is progressively reduced to trim the speed of the accessory as the engine speed accelerates until a predetermined phase of operation of the engine is reached, at which time the direction of rotation of the turbine will be reversed and its speed increased in the reverse direction to further trim the speed of the alternator. On the graph, line A represents an alternator speed of 6,000 r.p.m., for example, which is required to maintain the desired frequency of current being generated, and it will be noted that during counterclockwise rotation of the turbine the required alternator speed will be secured with lower rates of engine operation. When engine speed is increased, the rate of turbine rotation is decreased until it stops rotating in the counterclockwise direction and commences to operate in a clockwise direction. The rate of operation in the latter direction increases as the rate of operation of the engine is further increased. It will be seen from the graph that the turbine will be operating at a relatively slow speed during a particular phase of operation of the engine, this phase being designated on the curve as the "engine cruise condition." During this particular phase of engine operation, the majority of power, and in some installations, all of the power, imparted to the alternator will be supplied directly by mechanical power transmission to the alternator. Only a small percentage of power may be supplied by the turbine, or in certain installations some of the power supplied by the engine may be absorbed by the turbine to limit the alternator speed.

It may be pointed out that ordinarily the generation of pneumatic power to drive a turbine to generate electrical power is more expensive than the generation of shaft power for the same purpose, but assuming that both pneumatic and shaft power costs are equal, the translation of pneumatic power into usable electric power is still more expensive because of the inherent inefficiency of turbines. For this reason the mechanism forming the subject matter of the invention has been designed to mechanically extract the major portion of the power from the engine to operate the accessory and it will therefore operate more efficiently than similar mechanisms heretofore provided.

FIG. 2 shows one embodiment of the invention. In this figure the numeral 20 designates the combination engine starting and accessory drive mechanism in its entirety. This mechanism is composed of three major parts, the first being an element 21 in the form of a shaft through which power is transmitted to the mechanism from the engine E and vice versa. The second part comprises a gear type transmission designated generally by the numeral 22, and a third part, designated by the numeral 23, which is an auxiliary motor, in this instance, of a pneumatic turbine type.

In the form of the invention shown in FIG. 2, the mechanism 20 is provided to start the engine E and transmit rotary motion therefrom to an alternator, the housing portion of which is indicated by the numeral 24. In this form of the mechanism the shaft 21 which transmits power to and receives power from the engine extends axially through the alternator and the mechanism 20 is fastened to the end of the alternator housing 24 opposite the portion secured to the engine power takeoff pad. The alternator has a shaft 25 in which the shaft 21 is telescoped, both shafts extending into the casing 26 which houses the gear transmission 22. As shown in FIG. 2, a selectively operated disconnect clutch 27 is disposed between the shaft 21 and the shaft ES or other rotating part of the engine. The purpose of this disconnect clutch will be made apparent in part of the description which follows.

The housing 26 supports the air turbine motor 23 at its forward end or the end remote from the alternator. The air turbine motor includes a casing 28 which may be suitably secured to the casing 26, both casings cooperating to support bearings 30 in which a shaft 31 of the motor is journaled. This shaft is formed integrally with the wheel 32 of the turbine, which is of the centripetal type; that is, one in which fluid under pressure is supplied to the periphery of the turbine, the air impinging on substantially radially extending blades 33 and flowing through channels between such blades to effect rotation of the wheel, the air turning and flowing from the wheel in an axial direction. The turbine wheel may or may not be provided with an exducer portion 34, depending upon the desires of the manufacturer, to facilitate the flow of air from the wheel.

It was pointed out in the objects that the air turbine motor is to be operated in both forward and reverse or clockwise and counterclockwise directions. To secure these operations, the housing of the turbine is provided with two inlet plenums 35 and 36, these plenums being alternately supplied with compressed air, or other suitable fluid, through inlet ducts 37 and 38, respectively. Air flows from the plenums inwardly to the wheel through nozzle mechanisms indicated generally by the numerals 40 and 41, each nozzle mechanism communicating with its respective plenum. As may be observed from FIG. 3, the nozzle vanes of the mechanism 40 are inclined to cause the turbine wheel to rotate in a counterclockwise direction as viewed in such figure, while the vanes in nozzle mechanism 41 are inclined to cause wheel rotation in the opposite direction. It should be obvious that when fluid under pressure is supplied through duct 37, the turbine wheel will rotate in one direction, the speed of rotation being determined by the volume, the temperature, and the pressure of the air. When air is supplied to the duct 38, the turbine wheel will obviously rotate in the opposite direction.

The gear transmission 22 includes a planetary gear carrier 42 which is supported for rotary movement in bearings 43 and 44. This carrier supports two sets of planetary gears, the sets being indicated generally by the numerals 45 and 46. The set 45 of the planetary gears includes two gears of different sizes, gear 47 being the smaller gear, the other gear being designated by the numeral 48. This latter gear meshes with a pinion or sun gear 50 secured for rotation with the turbine wheel shaft 31. The smaller planet gear 47 meshes with an internal ring gear 51 which is stationarily secured to the gear casing 26. Suitable means, such as flange 52 on the gear 47, rolls in a groove 53 in the ring gear 51 to maintain the lateral position of the planet gears 47 and 48. The other set 46 of planet gears includes three gears, the first or smallest gear being designated by the numeral 54, the intermediate gear by the numeral 55, and the larger gear by the numeral 56. It will be observed from FIGS. 4 and 5 that a plurality, for example, three clusters of gears, may be provided to make up each set of planetary gears 45 and 46.

The planet gears of sets 46 are arranged in meshing engagement with complemental sun gears 57, 58 and 59, gears 54 meshing with gear 57, gears 55 with gear 58, and gears 56 with gear 59. Sun gear 57 is provided with a sleeve-like shaft 61 which is journaled in bearings 62 mounted in a portion of the casing 26. Shaft 61 is also provided with a race-like member 63 forming a part of a device 64 employed as a brake or equivalent means for restricting sleeve-like shaft 61 and gear 57 to a single direction of rotation. The race 63 forms the inner portion of the brake 64 and an outer race 65 of such brake is rigidly secured to the casing 26. A plurality of pawl elements 66 are supported between the races 63 and 65, these pawls being normally inclined, as indicated in FIG. 6, to permit relative rotation in one direction between the races 63 and 65. As the race 63 tends to rotate in the opposite direction, the pawls will be forcibly engaged with the races to prevent the rotation of the race 63 in such direction. The purpose of this mechanism will be set forth hereinafter.

From FIG. 2 it will be observed that sun gear 58 is rigidly secured to the inner end of shaft 21 which, as previously pointed out, transmits rotary motion to and from the engine equipped with the combination starter and accessory drive mechanism. Sun gear 59 is rigidly attached to the hollow shaft of the alternator. Suitable bearings may be disposed between the inner end of the shaft 21 and the planet carrier 42 to support the shaft and sun gear 58 against lateral movement. It is important to observe at this time that the cluster of gears forming the sets of planet gears are integrally constructed or fixed to one another for unitary rotation.

It will be noted from FIG. 6 that the brake 64 is so constructed that the tubular shaft 61 which carries the sun gear 57 will be restrained against rotation in a counterclockwise direction when viewed as indicated by the line 6—6 of FIG. 2. This feature is utilized during the initiation of engine operation. When this function of the mechanism is desired, fluid under pressure is supplied to the inlet conduit 37. This fluid will flow to the nozzle mechanism 40 which causes the turbine wheel 32 to rotate in a counterclockwise direction. This direction of rotation will accordingly be transmitted to the pinion 50, which in turn transmits clockwise rotation to the gears 48. Similar rotation will be imparted to the gears 47 since they are integrally formed with or secured to the gears 48.

As gears 47 revolve in a clockwise direction, they will roll around the inside of the stationary ring gear 51, causing rotary movement in a counterclockwise direction to be imparted to the carrier 42. This motion of the carrier is also imparted to the axes of the sets 46 of the planetary gears. Since gears 54 of such sets are in engagement with sun gear 57, there will be a tendency to rotate this gear in the same direction about the axis of shaft section 61. Since the brake 64, however, prohibits rotation in this direction by shaft 61 and gear 57, gear 54 will react with and roll around gear 57, imparting counterclockwise rotary movement to gears 55 and 56 which are integrally formed therewith. It will be obvious that when gears 55 and 56 are rotated, clockwise rotary movement will be transmitted thereby to the sun gears 58 and 59. Since sun gear 59 is secured to the shaft of the alternator, the armature (not shown) of the alternator will also be revolved. During the engine starting operation, however, the alternator will generally be electrically unloaded by suitable switch means (not shown), so that this rotary motion will be of no effect. The rotation of sun gear 58 is transmitted through the shaft 21 to the engine to initiate the operation thereof. It will be obvious that prior to the starting operation, the disconnect clutch 27 will be actuated to effect a driving connection between the shaft 21 and the engine.

The relative sizes of gears 50, 48, 47, 51, 54, 57, 55, and 58 are selected to cause the transmission of power and the rate of rotation necessary to effect the initiation of operation of the engine. It will be obvious from the foregoing description that certain gears react with one another to impart rotary movement to the various parts of the transmission to effect engine starting rotation of shaft 21 when the turbine is initially revolved in a counterclockwise direction. The gears are also selected to cause the rotary movement of the turbine, after the engine operation is initiated, to trim the speed of the alternator. After the engine operation is initiated, power will be transmitted from the engine through shaft 21 to the sun gear 58 and through this gear to gears 55. The latter gears will in turn cause gears 56 to revolve, transmitting rotary movement to gear 59 and the parts of the alternator connected therewith.

From FIG. 1 it will be observed that the turbine rotates in a counterclockwise direction to initiate the operation of the engine. After such operation is initiated the turbine and engine will both transmit power to the alternator, causing its speed of operation to increase until the rate is sufficient to produce a current of the desired frequency. The alternator may then be loaded by the operation of suitable switch means (not shown). The engine will continue to accelerate and it then becomes necessary to trim the speed of rotation of the alternator to maintain the current generated at the proper frequency. To perform this operation the speed of the turbine is reduced by decreasing the volume of fluid under pressure supplied to the inlet duct 37.

The mechanism for sensing the alternator speed is indicated generally by the numeral 67. This speed sensing mechanism may be of the type shown in Patent No. 2,896,653 issued July 28, 1959, to Elmer D. Marlin, or any other suitable type. Such mechanism is driven by intermeshing gears 68 on the alternator shaft and an idler shaft 70 journaled in the casing 24. This shaft is provided with a body 71 forming a part of the speed sensing device. Body 71 is provided with fluid passages 72 communicating via passage 73 with a control system shown in FIG. 8 and designated generally by the numeral 74. The passages 72 have outlet ends disposed for engagement by valve elements 75 carried by resilient means 76 which are responsive to centrifugal force to move the valves from passage closing positions to port opening positions. When the ends of passages 72 are open, fluid may escape and thus transmit a signal to the control system.

The control system is shown diagrammatically in FIG. 8. It includes a manifold 77 leading from a suitable source of fluid pressure such as a ground cart or the compressor of a gas turbine engine from which air under pressure may be cross-bled. This manifold is provided with branch passages 78 and 80, the first of which is connected by suitable conduit means with inlet duct 37 of the air turbine motor 23. The branch 80 is connected with the other inlet passage 38 of the air turbine motor. The latter passage may be termed the "air brake inlet." Passages 78 and 80 are provided with control valves 81 and 82, respectively. These valves are pressure responsive valves of any suitable type. Valves 81 and 82 are provided with fluid pressure responsive wall or piston means 83 to which fluid pressure may be applied to control the position of movable valve elements 84. The latter elements are exposed to fluid pressure in the manifold branches 78 and 80, which tends to move the valves toward an open position.

The control system also includes a pilot valve mechanism designated generally by the numeral 85 and an actuator mechanism designated generally by the numeral 86. The pilot valve mechanism is connected by the passage 73 with the sensor 67 to receive signals therefrom. Passage 73 may be connected by a line 87 with the manifold 77 or other suitable source of fluid pressure. A suitable pressure regulator 88 is provided in line 87 to reduce the pressure of fluid flowing to the passage 73 to a desirable value. The line 87 contains an orifice 89 for purposes which will be apparent from the following description. Pilot valve 85 includes a casing 90 in which a spool valve 91 is disposed for movement. The casing 90 also forms a chamber 92 in which a diaphragm 93 or other movable wall member may be supported, the diaphragm illustrated being marginally clamped and serving to divide the chamber 92 into sections 94 and 95. Section 94 may be termed the actuating pressure section, this section being in communication with passage 73 to receive fluid under pressure from the manifold 77 or other pressure source. Chamber 94 also is provided with a spring 96 which tends to urge the diaphragm 93 in one direction in opposition to fluid pressure introduced to the chamber section 94. The diaphragm 93 is connected by a stem 97 with the spool valve 91 to effect movement theerof in response to pressure changes in chamber section 94. The casing 90 is provided with a plurality of ports 98 to 102, inclusive. Port 98 constitutes an inlet port and is connected by a passage 103 with line 87 to receive fluid pressure from the manifold 77. Passages 104 and 105 extend from ports 99 and 100 to ports 106 and 107, respectively, formed in the casing 108 of actuator 86.

This member includes piston chambers 109 and 110 and valve chambers 111 and 112. Pistons 113 and 114 are disposed for movement in chambers 109 and 110, respectively, while valve elements 115 and 116 are disposed for movement in valve chambers 111 and 112, respectively. The pistons and valves are connected for movement in unison by rod means 117. The casing 108 of the actuator also contains ports 118 and 120, these ports being connected by passages 121 and 122 with chambers 123 and 124, respectively, of valves 81 and 82, the latter chambers movably receiving the pistons 83. Casing 108 of the actuator is also provided with ports 125 and 126 leading from chambers 111 and 112, respectively, to the atmosphere or other region of low pressure. Passages 121 and 122 communicate with manifold 77 through branches 121a and 122a, respectively. These branches contain orifices to restrict the flow of fluid under pressure therethrough. When the movable elements of pilot valve 85 and actuator 86 are in the positions shown in FIG. 8, and the manifold 77 is supplied with fluid under pressure, fluid pressure will be applied through branch passages 121a and 122a to the chambers 123 and 124, causing pistons 83 to hold valve elements 84 in positions to close branch passages 78 and 80.

When the alternator is at rest, valves 75 of the alternator speed sensing mechanism 67 will be closed. If manifold 77 is not at this time being supplied with fluid under pressure, spring 96 will hold valve 91 at an idle position which is disposed at the left-hand side of that occupied by the valve in FIG. 8. When fluid pressure is initially supplied to the manifold 77, some of the pressure will flow through line 87 to passage 73. Since valves 75 of the alternator speed sensing mechanism are closed, pressure in passage 73 will quickly increase and be transmitted to chamber section 94. This fluid pressure will urge the diaphragm 93 toward the right as viewed in FIG. 8, until the valve 91 is in position to establish communication between the inlet port 98 and port 100. In such position valve 91 also establishes communication between ports 99 and 102. Fluid may then flow from the manifold 77 through passages 87, 103 and 105 to chamber 109 of the actuator 86. This pressure will be applied to piston 113 to move it toward the left as viewed in FIG. 8, this movement being possible since chamber 110 is then connected with the atmosphere through passage 104 and port 102. Leftward movement of piston 113 imparts similar movement to valve elements 115 and 116. This movement of the valve 115 will establish communication between passage 121 and the atmosphere through the connection of ports 118 and 125 and fluid may then flow from chamber 123 of valve 81 at a faster rate than the orifice in branch 121a will permit fluid to flow into the chamber. The pressure therein will fall, permitting fluid pressure in branch 78 to move valve element 84 away from its seat and establish fluid flow through branch 78 to duct 37 of the turbine. Such flow of fluid will cause the turbine to rotate in a counterclockwise or engine starting direction. When fluid is supplied to move piston 113 toward the left, pressure from passage 105 will also flow through branch passage 105a to chamber 95 in a feedback action, which will tend to return valve spool 91 toward an intermediate or closed position in which communication between ports 98 and 100 is interrupted. Branch passage 105a communicates via a capillary tube 105b with a second branch passage 104a extending from passage 104 to a chamber 95a corresponding to chamber 95 and located at the opposite end of valve 90. Chamber 95a is open to a diaphragm 93a which corresponds to diaphragm 93. Fluid flowing through tube 105b serves to equalize the pressures in chambers 95 and 95a and permits the spool valve to assume a position determined by the balance of forces of the fluid pressure in chamber 94 and spring 96. Pressures in chambers 109 and 110 are also balanced, permitting pistons 113 and 114 together with valve elements 115 and 116 to remain in the positions to which they have been moved until a succeeding signal has been transmitted to the pilot valve mechanism 85. It should be obvious that the control system illustrated has been shown as an example only and may be modified in many ways, yet still perform the same control functions.

Initial counterclockwise movement of the turbine will be applied through the gear type transmission, as previously pointed out, to effect engine starting movement of shaft 21. As turbine speed increases, engine speed will be correspondingly increased until the engine operation is initiated. After actual engine operation starts, the engine will accelerate and transmit torque through shaft 21 and the gear transmission 22 to the alternator. As previously pointed out, the alternator may be loaded after the engine operation has started and the required alternator speed is reached.

As the engine continues to accelerate, it will tend to increase the speed of rotation of the alternator shaft. This tendency will be sensed by the mechanism 67, causing valves 75 to be unseated and permit fluid pressure to bleed from passage 73. When this bleeding of pressure tends to exceed the volume flowing through restriction 89, pressure will be decreased in chamber section 94 of the pilot valve mechanism and spring 96 will then move valve 91 to the left, as viewed in FIG. 8, to completely interrupt the flow of fluid from manifold 77 through passages 103 and 105 to chamber 109 and establish flow from the manifold 77 through passages 103 and 104 to chamber 110 of actuator 86. When this flow is established, piston 114 will be moved toward the right as viewed in FIG. 8, such movement being possible because chamber 109 of the actuator will then be vented to the atmosphere through passage 105 and port 101. When piston 114 moves to the right, similar movement will be imparted to valve element 115, causing it to move toward a position in which communication between chamber 123 of valve 81 and the atmosphere, through line 121 and port 125, will be decreased. As this communication is decreased, fluid flowing from manifold 77 through passages 121a and 121 will apply force to the piston 83 of valve 81 and move the valve elmeent 84 toward a closed position to modulate the flow of fluid under pressure through branch 78 to the turbine. This modulation of fluid flow will decrease the rate of operation of the turbine whereby the speed of the alternator will be trimmed to maintain the current being generated by the alternator at the desired frequency. As the engine continues to accelerate, the pilot valve 85 will be repeatedly operated in the same manner to cause the valve 81 to continue to decrease the flow of motivating fluid to the turbine. It should be obvious that if the alternator speed of operation should decrease, such change will be sensed by the mechanism 67 to cause the pilot valve 85 to so actuate valve 81 that the flow of fluid to the turbine will be increased whereby the alternator speed will be adjusted to maintain the required frequency of the current.

It will also be obvious that if the engine continues to accelerate, it will continue to mechanically exert through the transmission a force tending to oppose the counterclockwise rotation of the turbine. This continued acceleration of the engine will be reflected in alternator speed and be sensed by the mechanism 67; the signals generated thereby will cause the pilot valve 85 to continue to move valve 81 toward the closed position. The flow of fluid to the turbine through passage 78 will eventually be completely interrupted. Before this condition occurs, however, the forces exerted by the engine and the air applied through nozzles 40 to the turbine will be balanced, causing the turbine to stop rotating in a counterclockwise direction and start to rotate in a clockwise direction in opposition to the air issuing from nozzles 40. This clockwise operation of the turbine causes the gear transmission to further trim the speed of the alternator and absorbs some of the power delivered by the engine. The amount of power absorbed, however, is at a minimum, and the ratio of the gears is so calculated that the engine will be operating at or near a cruise condition. If the engine is caused to accelerate beyond the cruising speed and tends to further increase the speed of the alternator, this tendency will be sensed by the mechanism 67 and a signal will be transmitted to the pilot valve mechanism 85, which will then cause the actuator 86 to move to a position wherein chamber 124 of valve 82 will be partially vented to the atmosphere. At this time valve element 84 of valve 82 will be moved by fluid under pressure in branch 80 toward an open position to cause fluid flow through such branch to duct 38 of the air turbine. Fluid flow into this duct will be admitted through nozzles 41 to the turbine wheel to increase the rate of rotation in a clockwise direction. The tendency of the alternator speed to increase will be further counteracted by the clockwise rotation of the turbine.

It should be clear to the reader that when the engine speed is decreased, the speed of the alternator will tend to decrease and be sensed by the mechanism 67 through the closing movement of valves 75. This action will cause pressure in chamber section 94 to increase and move valve 91 in a direction to make actuator 86 operate valve 82 to reduce the flow of fluid to turbine nozzles 41. The clockwise rate of operation of the turbine will decrease to cause alternator speed to be maintained.

As previously pointed out, one of the objects of this invention is to provide a mechanism by which the accessory may be operated at a predetermined or required speed when the engine is inoperative for any of a number of reasons. To secure this object, the selectively operated disconnect clutch 27 has been provided. When the clutch is operated to disconnect the drive mechanism from the engine, the turbine may be operated in the counterclockwise direction to effect the operation of the alternator or other accessory. The transmission will function in the same manner employed in the engine starting operation, but rotary movement of shaft 21 will not be transmitted to the engine due to the disconnect of clutch 27. When the mechanism is operated in this manner, the tendency of the alternator to vary from the required speed will be sensed by the mechanism 67 and signals transmitted to the control system 74 will cause this system to regulate the speed of operation of the turbine whereby the required speed of the alternator or other accessory will be maintained.

A modified type of mechanism embodying the principles of the invention has been illustrated in FIG. 9. This mechanism, designated generally by the numeral 130, is somewhat simpler than the form first described in that fewer gears are utilized, but the operation is quite similar. As in the first device, the mechanism 130 has a shaft 131 for transmitting power to and from the engine to which the mechanism is applied, a gear type transmission 132, and an air turbine auxiliary motor 133 of the reversible type. In the form of the invention shown in FIG. 9, arrangements have been made to locate the accessory, such as an alternator (not shown), at one side of the axis of the mechanism, the shaft 134 of the alternator extending at right angles to such axis. A set of bevel gears 135 has been provided to transmit rotary movement from the mechanism to the accessory. The mechanism 130 also includes a selectively operated disconnect clutch 136 by which the drive to and from the engine may be interrupted when necessary or desired. In certain of the modified forms of the invention, a brake similar to that shown at 64 in FIG. 2 may be employed to limit parts of the mechanism to a single direction of rotation to facilitate the engine starting operation.

The air turbine motor 133 is the same as the one illustrated in FIGS. 2 and 3 having a shaft 137 journaled for rotary movement in ball bearings 138, the shaft carrying a centripetal turbine wheel 140. Two plenums 141 and 142 are provided to alternately receive air under pressure from a suitable source and direct it through nozzle means to cause the wheel to rotate in forward or reverse directions. The shaft 137 has a sun gear 143 at its inner end, the gear being rotated when the turbine wheel rotates and in the same direction as the wheel.

The major difference between the form of the invention shown in FIG. 9 and the first form resides in the transmission 132. This structure includes a planetary gear carrier 144 which, as in the first form, is supported for rotary movement in the transmission casing 145. The carrier 144 rotatably receives a plurality of planet gear sets 146, each of which has two different sized gears 147 and 148. Gears 147 and 148 are integrally formed to rotate together and each meshes with an internal ring gear, gears 147 being the smaller and meshing with ring gear 150, while gears 148 mesh with ring gear 151. Ring gear 150 is formed in a pan-shaped body 152 which is welded or otherwise secured to a stub shaft 153 which carries part of the disconnect clutch 136 and is connected thereby with the shaft 131. Ring gear 151 is also formed in a pan-shaped body 154 extending around body 152, the body 154 being suitably connected to drive a sleeve-like shaft section 155. The latter shaft section carries one of the bevel gears 135 and serves to transmit rotary movement through such gears to the accessory or alternator.

As shown in FIG. 9, the carrier 144 is provided with means for selectively restraining it against rotary movement. In the form selected for illustration the restraining means includes one or more sockets 156 for the reception of a bolt 157 mounted for sliding movement in casing 145. When the bolt is disposed in socket 156, the carrier will be held against movement. At such time rotation of the turbine wheel will cause the planet gears to transmit rotary movement to the ring gears 150 and 151 and the shaft sections connected therewith. When the mechanism is to be employed to start the engine, the carrier is held against rotary movement in the manner set forth above, and if desired or necessary, the alternator may be electrically unloaded. When air under pressure is supplied to the proper plenum to effect rotation of the turbine wheel in the required direction, starting movement will be imparted to the engine. After actual engine operation is initiated, bolt 157 may be withdrawn from the socket 156 to permit the carrier to rotate, whereby the turbine will be free to trim the speed of the alternator in accordance with signals transmitted by the speed sensor in the same manner as previously described. It should be obvious that means may be provided to effect the automatic release of the carrier when the alternator or other element of the transmission reaches a predetermined rate of operation. The carrier restraining mechanism may also be employed when it is desired to use the air turbine motor to effect the operation of the alternator and the engine is shut down for any reason. At this time the disconnect clutch 136 is operated to interrupt the transmission of power between shaft 131 and the mechanism 130. The control system for the reversible air motor, previously described, will then be used to keep the current being generated at the desired frequency.

In some instances it may be desired or found necessary to rotate the accessory at a different rate than it will be driven by the mechanism shown in FIGS. 2 and 9.

For example, the accessory may consist of an alternator designed to operate at a different rate of speed than the alternator driven by the first two forms of the invention. To secure this different rate of operation, additional gear mechanism may be incorporated in the transmission, as shown in FIGS. 11 and 13. In FIG. 11, the transmission is similar to that shown in FIG. 9, but is modified to include idler gears 158 which are journaled in the transmission casing and disposed in meshing engagement with an internal ring gear 160 formed in an extension 161 on the cup-shaped body 162 of ring gear 151a. This ring gear corresponds to ring gear 151 in the form of the invention shown in FIG. 9. Gears 158 also mesh with a pinion 163 formed on a sleeve-like shaft section 155a. This shaft section corresponds to shaft section 155 in the form of the invention shown in FIG. 9 and is employed to transmit rotary motion to the alternator.

Figure 12:
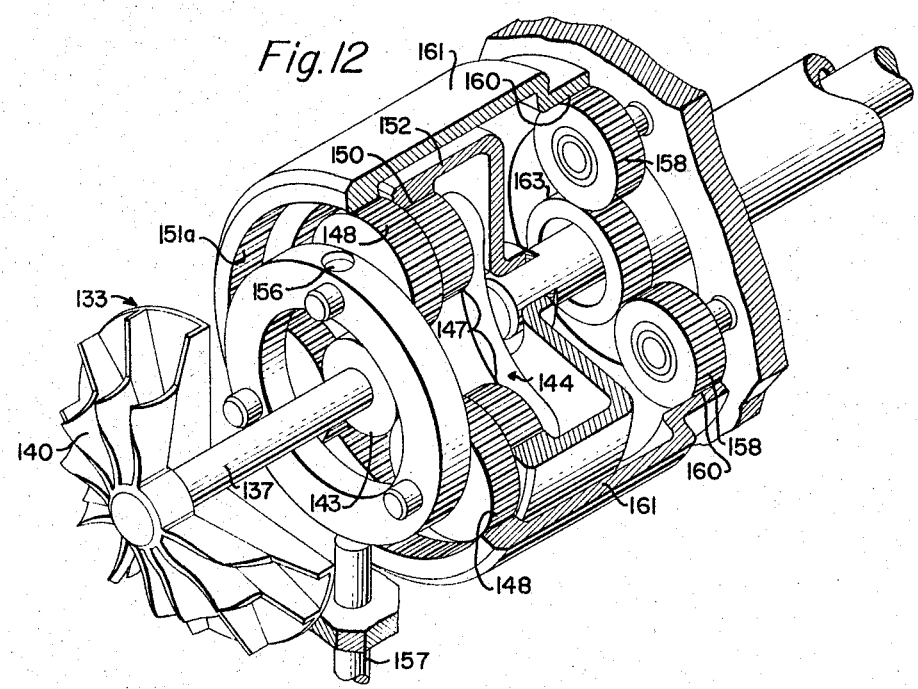
FIG. 12 is a schematic view in perspective showing the transmission of the mechanism illustrated in FIG. 11.
Figure 14:
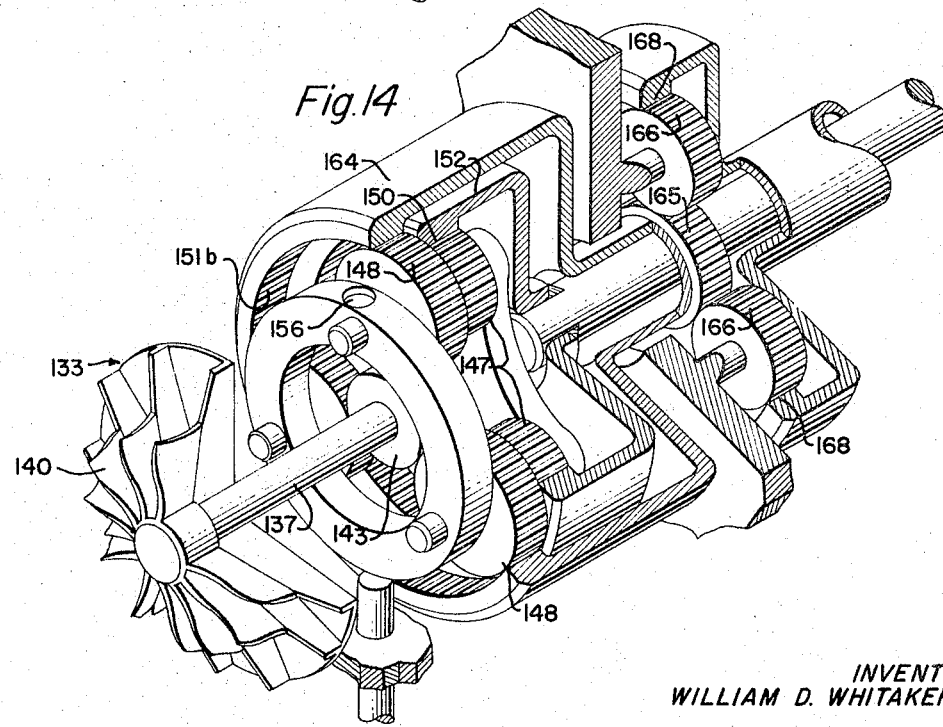
FIG. 14 is a schematic view in perspective showing the transmission of the mechanism illustrated in FIG. 13.

The transmission shown in FIG. 11 operates in the same manner as the transmission shown in FIG. 9. In FIG. 13 the transmission includes a ring gear 151b which corresponds to ring gear 151 and 151a in the second and third forms of the invention. Ring gear 151b has a cup-shaped body 164 which terminates adjacent the center in a tubular portion 165 on which is formed a pinion 166. This pinion is disposed in meshing engagement with idler gears 167 supported for rotary movement in the transmission housing. These idler gears also mesh with an internal ring gear 168 which is formed with or secured to a tubular shaft section 155b corresponding to shaft sections 155 and 155a. As in the other forms of the invention, the tubular shaft section 155b is employed to transmit rotary motion to the alternator or other accessory. The forms of the transmission shown in FIGS. 9, 11 and 13 are disclosed in perspective in FIGS. 10, 12 and 14, respectively.

It should be obvious that if the alternators are designed to rotate in a selected direction, the gearing will also be selected to effect such rotation. In all forms of the invention the auxiliary motors shown as of the air turbine type are designed to run in both forward and reverse directions and operate when initially driven in one direction to effect engine starting movement of an element forming a part of the mechanism. All forms of the invention also include means for restraining a part of the transmission against rotation in at least one direction during the engine starting operation. Such restraining means operates either selectively or automatically after engine operation is initiated to assist the auxiliary motor in trimming the speed of the alternator to secure current generation of the required frequency. All forms also have means for restraining a part of the mechanism against rotary movement when the auxiliary motor is employed to effect the operation of the accessory when the engine is shut down for any reason. During the latter operation a disconnect clutch is selectively operated to interrupt the driving connection between the mechanism and the engine. Each form of mechanism shown includes the disconnect clutch.

While several forms of the invention have been illustrated, the essential features of the invention, some of which have been pointed out above, are all included in the various forms. Numerous modifications in the structure may be made by persons skilled in the art without departing from the spirit and scope of the invention.

I claim:

1. A combination engine starter and accessory drive mechanism comprising: first and second members adapted to be operatively connected to an engine and an accessory thereof, respectively; a reversible variable speed motor; transmission gear means operatively connected between said motor and said first and second members, said transmission gear means having a first gear stationarily supported; a second gear held against rotation in one direction; gear means reacting on said first and second gears to impart engine starting rotation to said first member when said motor is operated in a predetermined direction; means responsive to variations in the rate of operation of one of said members for varying the rate of operation of said motor to regulate the speed of rotation imparted to said second member after the operation of the engine has been initiated; and means also responsive to variations in the rate of operation of one of said members for reversing the direction of operation of said motor and controlling the rate of operation thereof in the reverse direction.

2. A combination engine starter and accessory drive mechanism comprising: first and second members adapted to be operatively connected to an engine and an accessory thereof, respectively; a reversible variable speed motor; transmission gear means operatively connected between said motor and said first and second members; means for causing said motor to operate in a predetermined direction, said transmission gear means being driven by said motor to transmit engine starting rotation to said first member; means operative during a predetermined range of operating speed of the engine to vary the rate of operation of said motor in said predetermined direction to regulate the speed of rotation imparted to said second member; and a second means operative when the operating speed of the engine exceeds said predetermined operating range to reverse the direction of operation of said motor and vary the rate of operation thereof in said reverse direction to further regulate the speed of rotation imparted to said second member.

3. A combination engine starter and accessory drive mechanism comprising: first and second members adapted to be operatively connected to an engine and an accessory thereof, respectively; a reversible variable speed motor; transmission gear means operatively connected between said motor and said first and second members; means for causing said motor to operate in a predetermined direction, said transmission gear means being driven by said motor to transmit engine starting rotation to said first member; means responsive to variations in the rate of operation of one of said members during a predetermined range of operating speed of the engine to vary the rate of operation of said motor in said predetermined direction to regulate the speed of rotation imparted to said second member; and a second means also responsive to variations in the rate of operation of one of said members when the engine is operating in a range exceeding said predetermined operating range to reverse the direction of operation of said motor and vary the rate of operation thereof in said reverse direction to further regulate the speed of rotation imparted to said second member.

4. A combination engine starter and accessory drive mechanism comprising: first and second members adapted to be operatively connected to an engine and an accessory thereof, respectively; a reversible variable speed motor; transmission gear means operatively connected between said motor and said first and second members; means for causing said motor to operate in a predetermined direction, said transmission gear means being driven by said motor to transmit engine starting rotation to said first member; means responsive to variations in the rate of operation of one of said members as the engine accelerates after starting to reduce the rate of operation of said motor in said predetermined direction to regulate the speed of rotation imparted to said second member, rotation of said motor being interrupted near a predetermined speed; and a second means also responsive to variations in the rate of operation of one of said members when the rate of operation of the engine exceeds said predetermined speed to reverse the direction of operation of said motor and vary the rate of operation thereof in said reverse direction to further regulate the speed of rotation imparted to said second member.

5. A combination engine starter and acceessory drive mechanism comprising: first and second members adapted to be operatively connected to an engine and an accessory thereof, respectively; a reversible variable speed motor; transmission gear means operatively connected between said motor and said first and second members, said transmission gear means having first and second sets of planet gears supported by a rotary carrier; stationary means engaged by the first set of planet gears, operation of said motor in one direction causing the first set of planet gears to react with said stationary means and impart rotary movement to said carrier; means supported against rotation in one direction, said means being engaged by the second set of planet gears, rotation of said carrier causing said second set of planet gears to react with said last-named means to impart engine starting rotary movement to said first member, operation of the engine then imparting rotary movement to said second set of planet gears and said second member; means responsive to variations in the rate of operation of one of said members for varying the rate of operation of said motor to regulate the speed of rotation imparted to said second member; and additional means also responsive to variations in the rate of operation of one of said members for reversing the direction of operation of said motor and controlling the rate of operation thereof in the reverse direction.

6. A combination engine starter and accessory drive mechanism comprising: first and second members adapted to be operatively connected to an engine and an accessory thereof, respectively; a reversible variable speed motor; transmission gear means operatively connected between said motor and said first and second members, said transmission gear means having first and second sets of planet gears supported by a rotary carrier; a stationarily supported ring gear in meshing engagement with a gear of the first set of planet gears, operation of said motor in one direction causing the first set of planet gears to react with said ring gear and impart rotary movement to said carrier; means supported against rotation in one direction, said means being engaged by the second set of planet gears, rotation of said carrier causing said second set of planet gears to react with said last-named means to impart engine starting rotary movement to said first member, operation of the engine then imparting rotary movement to said second set of planet gears and said second member; means responsive to variations in the rate of operation of one of said members for varying the rate of operation of said motor to regulate the speed of rotation imparted to said second member; and additional means also responsive to variations in the rate of operation of one of said members for reversing the direction of operation of said motor and controlling the rate of operation thereof in the reverse direction.

7. A combination engine starter and accessory drive mechanism comprising: first and second members adapted to be operatively connected to an engine and an accessory thereof, respectively; a reversible variable speed motor; transmission gear means operatively connected between said motor and said first and second members, said transmission gear means having first and second sets of planet gears supported by a rotary carrier; a stationarily supported ring gear in meshing engagement with a gear of the first set of planet gears, operation of said motor in one direction causing the first set of planet gears to react with said ring gear and impart rotary movement to said carrier; sun gear means supported against rotation in one direction, said sun gear means being in meshing engagement with one gear of the second set of planet gears, rotation of said carrier causing said second set of planet gears to react with said sun gear means to impart engine starting rotary movement to said first member, operation of the engine then imparting rotary movement to said second set of planet gears and said second member; means responsive to variations in the rate of operation of one of said members for varying the rate of operation of said motor to regulate the speed of rotation imparted to said second member; and additional means also responsive to variations in the rate of operation of one of said members for reversing the direction of operation of said motor and controlling the rate of operation thereof in the reverse direction.

8. A combination engine starter and accessory drive mechanism comprising: first and second members adapted to be operatively connected to an engine and an accessory thereof, respectively; a reversible variable speed motor; transmission gear means operatively connected between said motor and said first and second members, said transmission gear means having first and second sets of planet gears supported by a rotary carrier; a stationarily supported ring gear in meshing engagement with a gear of the first set of planet gears, operation of said motor in one direction causing the first set of planet gears to react with said ring gear and impart rotary movement to said carrier; sun gear means supported against rotation in one direction, said sun gear means being in meshing engagement with one gear of the second set of planet gears, rotation of said carrier causing said second set of planet gears to react with said sun gear means to impart engine starting rotary movement to said first member, operation of the engine then imparting rotary movement to said second set of planet gears and said second member; speed controlling means for said motor; means responsive to variations in the rate of operation of one of said members to actuate said speed controlling means to vary the rate of operation of said motor and regulate the speed of rotation imparted to said second member; and additional means also responsive to variations in the rate of operation of one of said members for reversing the direction of operation of said motor and controlling the rate of operation thereof in the reverse direction.

9. A combination engine starter and accessory drive mechanism comprising: first and second members adapted to be operatively connected to an engine and an accessory thereof, respectively; a reversible variable speed motor; transmission gear means operatively connected between said motor and said first and second members, said transmission gear means having first and second sets of planet gears supported by a rotary carrier; a stationarily supported ring gear in meshing engagement with a gear of the first set of planet gears, operation of said motor in one direction causing the first set of planet gears to react with said ring gear and impart rotary movement to said carrier; sun gear means supported against rotation in one direction, said sun gear means being in meshing engagement with one gear of the second set of planet gears, rotation of said carrier causing said second set of planet gears to react with said sun gear means to impart engine starting rotary movement to said first member, operation of the engine then imparting rotary movement to said second set of planet gears and said second member; speed controlling means for said motor; means responsive to variations in the rate of operation of one of said members to actuate said speed controlling means to vary the rate of operation of said motor and regulate the speed of rotation imparted to said second member; additional means also responsive to variations in the rate of operation of one of said members to reverse the direction of operation of said motor; and a second speed controlling means for varying the rate of operation of said motor in the reverse direction.

10. A combination engine starter and accessory drive mechanism comprising: first and second members adapted to be operatively connected to an engine and an accessory thereof, respectively; an air turbine motor; first and second sets of nozzle means for applying air to said turbine motor to impart forward and reverse operation thereto; transmission gear means operatively connected between said air turbine motor and said first and second members; means responsive to variations in the rate of operation of one of said members to control the flow of air to the first set of nozzle means to vary the rate of forward operation of said air turbine motor and regulate the speed of rotation imparted to said second member; and additional means also responsive to variations in the rate of operation of one of said members to control the flow of air to the second set of nozzle means to reverse the direction of operation of said air turbine motor and vary the rate of reverse operation to further regulate the speed of rotation imparted to said second member.

11. A combination engine starter and accessory drive mechanism comprising: first and second members adapted to be operatively connected to an engine and an accessory thereof, respectively; an air turbine motor; first and second sets of nozzle means for applying air to said turbine motor to impart forward and reverse operation thereto; transmission gear means operatively connected between said air turbine motor and said first and second members, said transmission gear means having first and second sets of planet gears supported by a rotatable carrier; a sun gear operatively related to said air turbine motor and disposed in meshing engagement with a gear of said first set of planet gears; a stationarily supported ring gear also meshing with a gear of said first set of planet gears, operation of said air turbine motor in one direction causing said first set of planet gears to react with said ring gear and impart rotary movement to said carrier; sun gear means secured to said first and second members and meshing with gears of said second set of planet gears; means meshing with another gear of said second set of planet gears and serving to revolve the gears of said second set of planet gears when said carrier rotates, the sun gears on said first and second members being driven; means responsive to variations in the rate of rotation of one of said members to control the flow of air to the first set of nozzle means to vary the rate of forward operation of said air turbine motor and regulate the speed of rotation imparted to said second member; and additional means also responsive to variations in the rate of operation of one of said members to control the flow of air to the second set of nozzle means to reverse the direction of operation of said air turbine motor and vary the rate of reverse operation to further regulate the speed of rotation imparted to said second member.

12. A combination engine starter and accessory drive mechanism comprising: a casing; a first member journalled in said casing, said first member being adapted to be operatively connected with an engine to which the mechanism is to be applied; a first sun gear fixed to said first member; a second member journalled in said casing, said second member being adapted to be operatively connected with an accessory to be driven; a second sun gear fixed to said second member; motor means having an element mounted for rotation in said casing; a third sun gear fixed to the rotatable element of said motor means; means for causing forward and reverse rotation of the rotatable element of said motor means; a gear-type transmission in said casing, said transmission having a support for planet gears journalled in said casing; a first set of planet gears rotatably mounted in said support; a ring gear fixed to said casing, said first set of planet gears being in meshing relationship with said third sun gear and said ring gear, rotary movement of the rotatable element of said motor means being transmitted to said first set of planet gears to cause a reaction thereof with said ring gear and consequent rotary motion of said support; a second set of planet gears mounted for rotation in said support, certain gears of said second set of planet gears being in meshing engagement with said first and second sun gears; a fourth sun gear supported for rotation in said casing, said fourth sun gear meshing with a gear of said second set of planet gears; and means for limiting said fourth sun gear to one direction of rotation, the tendency of said support to cause said fourth sun gear to rotate in the opposite direction causing the latter to impart rotary movement to the planet gears of said second set and the sun gears meshing therewith.

13. A combination engine starter and accessory drive mechanism comprising: a casing; a first member journalled in said casing, said first member being adapted to be operatively connected with an engine to which the mechanism is to be applied; a first sun gear fixed to said first member; a second member journalled in said casing, said second member being adapted to be operatively connected with an accessory to be driven; a second sun gear fixed to said second member; reversible variable speed motor means having an element mounted for rotation in said casing; a third sun gear fixed to the rotatable element of said reversible motor; means responsive to the rate of operation of one of said members for selecting the direction and rate of operation of said reversible motor; a gear-type transmission in said casing, said transmission having a support for planet gears journalled in said casing; a first set of planet gears rotatably mounted in said support; a ring gear fixed to said casing, said first set of planet gears being in meshing relationship with said third sun gear and said ring gear, operation of said reversible motor causing rotation of said first set of planet gears and a reaction thereof with said ring gear and consequent rotary motion of said support; a second set of planet gears mounted for rotation in said support, a pair of gears of said second set of planet gears meshing with said first and second sun gears; a fourth sun gear supported for rotation in said casing, said fourth sun gear meshing with a gear of said second set of planet gears; and means for limiting said fourth sun gear to one direction of rotation, the tendency of said support to cause said fourth sun gear to rotate in the opposite direction causing the latter to impart rotary movement to the planet gears of said second set and the sun gears meshing therewith.

14. A combination engine starter and accessory drive mechanism comprising: a casing; first and second members journalled in said casing, said members being adapted to be operatively connected with the engine and accessory, respectively; an air turbine motor mounted on said casing, said air turbine motor having a wheel journalled for forward and reverse rotation; transmission gear means operatively connected between said turbine wheel and said members, said transmission gear means having first and second sets of planet gears supported on a rotatable carrier, the first set of planet gears having two gears of different relative sizes, the second set of planet gears having small, intermediate and large gears; a ring gear stationarily carried by said casing, the smaller gear of the first set of planet gears meshing with said ring gear; a first sun gear fixed for rotation with said turbine wheel, said sun gear meshing with the larger gear of the first set of planet gears; second and third sun gears fixed to said first and second members, respectively, said second and third sun gears meshing with the intermediate and large gears, respectively, of said second set of planet gears; a fourth sun gear supported for rotation in said casing and meshing with the small gear of said second set of planet gears; means for restricting said fourth sun gear to one direction of rotation, operation of said turbine wheel in a reverse direction causing said first set of planet gears to react on said ring gear and rotate said carrier, rotation of the latter causing the second set of planet gears to react on said fourth sun gear and transmit rotary motion to said first and second members; and means responsive to variations in the rate of rotation of one of said members to select the direction and control the rate of operation of said turbine wheel.

15. A combination engine starter and accessory drive mechanism comprising: a casing; first and second members journalled in said casing, said members being adapted to be operatively connected with the engine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, said transmission gear means having planet gears supported by a rotary carrier; means automatically operative upon rotation of said turbine wheel in a certain direction to cause said carrier to rotate, certain of said planet gears reacting when said carrier rotates to impart rotary movement to said first and second members, said first member serving when the engine is operating to transmit rotary motion to said transmission gear means; valve means for separately controlling the admission of air under pressure to said first and second sets of nozzle means; and means responsive to variations in the rate of rotation of one of said members to actuate said valve means to control the direction and rate of operation of said turbine wheel.

16. A combination engine starter and accessory drive mechanism comprising: a casing; first and second members journalled in said casing, said members being adapted to be operatively connected with the engine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, said transmission gear means having planet gears supported by a rotatable carrier; means automatically operative upon initial rotation of said turbine wheel in a predetermined direction to cause said carrier to rotate, said means having a gear element supported for rotation in said casing and means restricting rotation of said gear element to one direction only, certain of said planet gears serving when said carrier rotates to impart rotary engine starting movement to said first member, the latter member serving when the engine is operating to transmit rotary motion through said planet gears to said second member; valve means for separately controlling the admission of air under pressure to said first and second sets of nozzle means; and means responsive to variations in the rate of rotation of one of said members to actuate said valve means to control the direction and rate of operation of said turbine wheel.

17. A combination engine starter and accessory drive mechanism comprising: a casing; first and second members journalled in said casing, said members being adapted to be operatively connected with the engine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, said transmission gear means having planet gears supported by a rotatable carrier; a ring gear fixed to each of said first and second members, said ring gears meshing with said planet gears; means restricting said second member to one direction of rotation, initial rotation of said turbine wheel in a predetermined direction causing said carrier to rotate, certain of said planet gears serving when said carrier rotates to impart rotary engine starting movement to said first member, the latter member serving when the engine is operating to transmit rotary rotion through said planet and ring gears to said second member; valve means separately controlling the admission of air under pressure to said first and second sets of nozzle means; and means responsive to variations in the rate of rotation of one of said members to actuate said valve means to control the direction and rate of operation of said turbine wheel.

18. A combination engine starter and accessory drive mechanism comprising: a casing; first and second members journalled in said casing, said members being adapted to be operatively connected with the engine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, said transmission gear means having planet gears supported by a rotatable carrier; means automatically operative upon initial rotation of said turbine wheel in a predetermined direction to cause said carrier to rotate, said means having a gear element supported for rotation in said casing and means restricting rotation of said gear element to one direction only, certain of said planet gears serving when said carrier rotates to impart rotary engine starting movement to said first member, the latter member serving when the engine is operating to transmit rotary motion through said planet gears to said second member; means for selectively locking said carrier against rotation, operation of said turbine wheel in a predetermined direction then mechanically transmitting rotary movement directly to said first and second members; valve means for separately controlling the admission of air under pressure to said first and second sets of nozzle means; and means responsive to variations in the rate of rotation of one of said members to actuate said valve means to control the direction and rate of operation of said turbine wheel.

19. A combination engine starter and accessory drive mechanism comprising: a casing; first and second members journalled in said casing, said members being adapted to be operatively connected with the engine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, said transmission gear means having planet gears supported by a rotatable carrier; means automatically operative upon initial rotation of said turbine wheel in a predetermined direction to cause said carrier to rotate, said means having a gear element supported for rotation in said casing and means restricting rotation of said gear element to one direction only, certain of said planet gears serving when said carrier rotates to impart rotary engine starting movement to said first member, the latter member serving when the engine is operating to transmit rotary motion through said planet gears to said second member; means for selectively locking said carrier against rotation, operation of said turbine wheel in a predetermined direction then mechanically transmitting rotary movement directly to said first and second members; selectively engageable and disengageable clutch means forming a part of said first member; valve means for separately controlling the admission of air under pressure to said first and second sets of nozzle means; and means responsive to variations in the rate of rotation of one of said members to actuate said valve means to control the direction and rate of operation of said turbine wheel.

20. A combination engine starter and accessory drive mechanism comprising: a casing; first and second members journalled in said casing, said members being adapted to be operatively connected with the enine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, said transmission gear means having planet gears supported by a rotatable carrier; means automatically operative upon initial rotation of said turbine wheel in a predetermined direction to cause said carrier to rotate, said means having ring and spur gear elements supported for rotation in said casing and means restricting rotation of said ring and spur gear elements to one direction only, certain of said planet gears serving when said carrier rotates to impart rotary engine starting movement to said first member, the latter member serving when the engine is operating to transmit rotary motion through said planet gears and said ring and spur gear elements to said second member; valve means for separately controlling the admission of air under pressure to said first and second sets of nozzle means; and means responsive to variations in the rate of rotation of one of said members to actuate said valve means to control the direction and rate of operation of said turbine wheel.

21. A combination engine starter and accessory drive mechanism comprising: a casing; first and second members journalled in said casing, said members being adapted to be operatively connected with the engine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, said transmission gear means having planet gears supported by a rotatable carrier; means automatically operative upon initial rotation of said turbine wheel in a predetermined direction to cause said carrier to rotate, said means having a ring gear and a gear train in motion transmitting connection with said second member; means in said casing restricting said second member, said gear train, and said ring gear to rotation in one direction only, certain of said planet gears serving when said carrier is rotated by initial rotation of said turbine wheel in said predetermined direction to impart rotary engine starting movement to said first member, the latter member serving when the engine is operating to transmit rotary motion through said planet gears, said ring gear, and gear train to said second member; valve means separately controlling the admission of air under pressure to said first and second sets of nozzle means; and means responsive to variations in the rate of rotation of one of said members to actuate said valve means to control the direction and rate of operation of said turbine wheel.

22. A combination engine starter and accessory drive mechanism comprising: a casing; first and second members journalled in said casing, said members being adapted to be operatively connected with the engine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, siad transmission gear means having planet gears supported by a rotatable carrier; a first ring gear secured members, said transmission gear means having planet gears to said first member and meshing with certain of said planet gears; a second ring gear in driving relation with said second member and meshing with other of said planet gears; idler gear means between said second ring gear and said second member; means in said casing restricting one of said ring gears to rotation in one direction only, certain of said planet gears serving when said turbine wheel is initially rotated in a predetermined direction to impart a rotary movement to said carrier, said planet gears reacting when said carrier is so rotated to impart rotary engine starting movement to said first member, the latter member serving when the engine is operating to transmit rotary motion through said planet gears, said ring gears, and said idler gears to said second member; valve means separately controlling the admission of air under pressure to said first and second sets of nozzle means; and means responsive to variations in the rate of rotation of one of said members to actuate said valve means to control the direction and rate of operation of said turbine wheel.

23. A combination engine starter and accessory drive mechanism comprising: a casing; first and second members journalled in said casing, said members being adapted to be operatively connected with the engine and an accessory thereof, respectively; an air turbine motor mounted on said casing, said air turbine motor having a wheel journalled for forward and reverse rotation; first and second sets of nozzle means for directing air from a suitable source through said turbine wheel to cause forward and reverse operation thereof; transmission gear means operatively connected between said turbine wheel and said members, said transmission gear means having planet gears supported by a rotatable carrier; a first ring gear secured to said first member and meshing with certain of said planet gears; a second ring gear in driving relation with said second member and meshing with other of said planet gears; idler gear means between said second ring gear and said second member; brake means in said casing for restricting said second member to rotation in one direction only, said brake means serving to prevent said second ring gear from rotating in a predetermined direction, certain of said planet gears serving when said turbine wheel is initially rotated in a predetermined direction to impart rotary engine starting movement to said first member, the latter member serving when the engine is operating to transmit rotary motion through said planet gears, said ring gears, and said idler gears to said second member; valve means separately controlling the admission of air under pressure to said first and second sets of nozzle means; and means responsive to variations in the rate of rotation of one of said members to actuate said valve means to control the direction and rate of operation of said turbine wheel.

24. A combination engine starter and accessory drive mechanism comprising: a casing; first and second concentric telescoped members journalled in said casing, said members being adapted to be operatively connected with the engine and an accessory thereof, respectively; an air turbine motor on said casing, said motor having a wheel journalled for forward and reverse rotation in said casing about an axis aligned with the common axis of said members; transmission gear means in said casing operatively connected between said turbine wheel and said first and second members, said transmission gear means having planet gears supported by a rotatable carrier; additional gear means supported in said casing against rotation in one direction at least, said additional gear means meshing with predetermined planet gears, initial operation of said turbine wheel in one direction causing said planet gears to react on said additional gears and impart rotary movement to said carrier, such movement of said carrier causing certain planet gears to transmit engine starting rotary movement to said first member, the latter member serving when the engine is operating to transmit rotary motion through certain planet gears to said second member; first and second sets of nozzles for directing air under pressure through said turbine wheel to cause forward and reverse operation thereof, respectively; valve means for separately controlling the admission of air to said nozzles; and means responsive to variations in the rate of operation of one of said members to actuate said valve means to control the direction and rate of operation of said turbine wheel.

25. A combination engine starter and accessory drive mechanism comprising: first and second members adapted to be operatively connected to an engine and an accessory thereof, respectively; a variable speed motor; transmission gear means operatively connected between said motor and said first and second members; means responsive to variations in the speed of operation of one of said members for controlling the speed of operation of said motor and thus regulating the speed of operation of said second member; means operatively connected with said transmission means to prevent a part thereof from rotating in a certain direction when said motor is operated in a predetermined direction to initiate the operation of the engine; and selectively operable clutch means forming a part of said first member for interrupting the transmission of power therethrough so that substantially all of the power from said motor will be transmitted through said second member to the accessory.

26. A combination engine starter and accessory drive mechanism comprising: first and second members adapted to be operatively connected to an engine and an accessory thereof, respectively; a variable speed motor; transmission gear means operatively connected between said motor and said first and second members, said transmission gear means having connected coaxial sets of planet gears supported by a rotatable carrier; a first ring gear connected with said first member and meshing with certain of said planet gears; a second ring gear in driving relation with said second member and meshing with other of said planet gears; means selectively operable to interrupt rotary movement of said carrier and cause at least part of said planet and ring gears to transmit engine starting torque through said first member; and clutch means operatively associated with said first member for interrupting the transmission of power therethrough and causing substantially all the torque generated by said motor to be transmitted by the second member to the accessory.

27. A combination engine starter and accessory drive mechanism comprising: first and second members adapted to be operatively connected to an engine and an accessory thereof, respectively; a variable speed motor; transmission gear means operatively connected between said motor and said first and second members, said transmission gear means having connected coaxial sets of planet gears supported by a rotable carrier; a first ring gear connected with said first member and meshing with certain of said planet gears; a second ring gear in driving relation with said second member and meshing with other of said planet gears; and means selectively operable to interrupt rotary movement of said carrier and cause at least part of said planet and ring gears to transmit engine starting torque through said first member.

28. A combination engine starter and accessory drive mechanism comprising: first and second members adapted to be operatively connected to an engine and an accessory thereof, respectively; an air turbine motor having a wheel journalled for forward and reverse rotation; first and second sets of nozzle means for directing air from a suitable source through said turbine wheel to cause forward and reverse operation thereof; transmission gear means having connected coaxial sets of planet gears supported by a rotatable carrier; a first ring gear secured to said first member and meshing with certain of said planet gears; a second ring gear in driving relation with said second member and meshing with other of said planet gears; means selectively operable to prevent rotation of said carrier and cause at least part of said planet and ring gears to transmit engine starting torque from said turbine through said first member; means for separately controlling the admission of air under pressure to said first and second sets of nozzle means; and means responsive to variations in the speed of rotation of one of said members to actuate said air controlling means to control direction and speed of operation of said turbine wheel.

29. In a combination engine starter and accessory drive mechanism: first and second members adapted to be operatively connected with an engine and an accessory thereof, respectively; an air turbine motor having a wheel journalled for forward and reverse rotation; nozzle means for directing air under pressure from a suitable source through said turbine wheel to alternately cause forward and reverse operation thereof; motion transmitting gear means operatively connecting said turbine wheel and said first and second members, cooperation of said turbine wheel and gear means when said first member is being driven by an engine serving to adjust the speed of said second member to a predetermined rate; a control system for said air turbine motor, said system having valve means for selecting and controlling air flow to said air turbine to cause forward and reverse operation thereof; a second valve means responsive to fluid pressure to govern the operation of the first-mentioned valve means; a pilot valve means in said system for controlling the application of fluid pressure to said second valve means; and means responsive to the speed of operation of one of said members for transmitting control signals to said pilot valve means.

30. In a combination engine starter and accessory drive mechanism: first and second members adapted to be operatively connected with an engine and an accessory thereof, respectively; an air turbine motor having a wheel journalled for forward and reverse rotation; first and second sets of nozzle means for directing air from a suitable source through said turbine wheel to cause forward and reverse operation thereof; motion transmitting gear means operatively connecting said turbine wheel and said first and second members, cooperation of said turbine wheel and gear means when said first member is being driven by an engine serving to adjust the speed of said second member to a predetermined rate; a control system for said air turbine motor, said system having forward and reverse valves for selecting and controlling air flow to said first and second sets of nozzle means to cause forward and reverse operation of said air turbine motor; a main valve means responsive to fluid pressure to govern the operation of the forward and reverse valves; a pilot valve means in said system for controlling the application of fluid pressure to said main valve means; and means responsive to the speed of operation of one of said members for transmitting control signals to said pilot valve means.

31. A combination engine starter and accessory drive mechanism comprising: first and second members adapted to be operatively connected to an engine and an accessory thereof, respectively; a reversible variable speed motor; variable speed gear means operatively connected between said motor and each of said first and second members; said gear means being so constructed and arranged so as to allow variations in the speed of the first and second members relative to each other; means responsive to variations in the rate of operation of one of said members for selecting the direction and magnitude of the torque of said reversible motor within a motor-speed range extending to both sides of zero speed; and means operatively connected with said gear means to prevent a part thereof from rotating in a certain direction when said motor is operated in a predetermined direction to initiate the operation of the engine.

32. A combination engine starter and accessory drive mechanism comprising: first and second members adapted to be operatively connected to an engine and an accessory thereof, respectively; a reversible variable speed motor; transmission gear means operatively connected between said motor and said first and second members; means responsive to variations in the rate of operation of one of said members for controlling the direction of the torque of said reversible motor; and means operatively connected with said transmission gear means to prevent a part thereof from rotating in a certain direction when said motor is operated in a predetermined direction to initiate the operation of the engine.

33. A combination engine starter and accessory drive mechanism comprising: first and second members adapted to be operatively connected to an engine and an accessory thereof, respectively; a reversible variable speed motor; transmission gear means operatively connected between said motor and said first and second members; means for selecting the direction of operation of said reversible motor; said last named means including means responsive to variations in the rate of operation of one of said members for selecting at least one direction of operation of the reversible motor; and means operatively connected with said transmission gear means to prevent a part thereof from rotating in a certain direction when said motor is operated in a predetermined direction to initiate the operation of the engine.

References Cited by the Examiner

UNITED STATES PATENTS

| | | | |
|---|---|---|---|
| 1,313,842 | 8/1919 | Tridice | 253—51 |
| 2,047,050 | 7/1936 | Armington | 74—675 |
| 2,402,547 | 6/1946 | Gilfillan | 74—675 |
| 2,820,341 | 1/1958 | Amann | 253—59 |
| 2,908,189 | 10/1959 | Parker et al. | 74—675 |
| 2,959,918 | 11/1960 | West | 60—39.14 |

FOREIGN PATENTS

| | | |
|---|---|---|
| 740,077 | 11/1932 | France. |
| 759,606 | 10/1956 | Great Britain. |

DAVID J. WILLIAMOWSKY, *Primary Examiner.*

BROUGHTON G. DURHAM, DON A. WAITE,
*Examiners.*

F. G. McKENNA, M. H. FREEMAN, T. C. PERRY,
*Assistant Examiners.*